United States Patent
Strickland et al.

(10) Patent No.: US 9,975,577 B2
(45) Date of Patent: May 22, 2018

(54) ROLL FORMED STEEL BEAM

(75) Inventors: Michael R. Strickland, Richmond Hill (CA); Douglas M. Fox, Kitchener (CA); Richard Wilson Strickland, Richmond Hill (CA)

(73) Assignee: ISPAN SYSTEMS LP, Princeton, ON (CA)

( * ) Notice: Subject to any disclaimer, the term of this patent is extended or adjusted under 35 U.S.C. 154(b) by 601 days.

(21) Appl. No.: 13/386,646

(22) PCT Filed: Jul. 22, 2010

(86) PCT No.: PCT/CA2010/001128
§ 371 (c)(1),
(2), (4) Date: Sep. 10, 2012

(87) PCT Pub. No.: WO2011/009204
PCT Pub. Date: Jan. 27, 2011

(65) Prior Publication Data
US 2012/0328898 A1   Dec. 27, 2012

Related U.S. Application Data

(60) Provisional application No. 61/227,614, filed on Jul. 22, 2009.

(51) Int. Cl.
*B21C 37/00* (2006.01)
*B62D 21/02* (2006.01)
(Continued)

(52) U.S. Cl.
CPC ............. *B62D 21/02* (2013.01); *B62D 21/20* (2013.01); *E04C 3/07* (2013.01);
(Continued)

(58) Field of Classification Search
CPC ...... E04C 2003/0421; E04C 2003/0452; E04C 2003/0434; E04C 2003/046; E04C 3/06;
(Continued)

(56) References Cited

U.S. PATENT DOCUMENTS 518,645 A * 4/1894 Crittenden ...................... 52/364
693,560 A * 2/1902 Molloy ........................... 52/842
(Continued)

FOREIGN PATENT DOCUMENTS

AU            47479/79      12/1980
AU            540590        1/1985
(Continued)

OTHER PUBLICATIONS

International Search Report for PCT/CA2010/001750, dated Feb. 21, 2011.
(Continued)

*Primary Examiner* — Seth Dumbris
(74) *Attorney, Agent, or Firm* — Hill & Schumacher (57) ABSTRACT

The present invention relates to a cold rolled steel beam comprising: a web having two layers of steel, the web having a top end and a bottom end; a pair of bottom flanges extending outwardly from the bottom end of the web; and a pair of top flanges extending outwardly from the top end of the web, each top flange having two layers of steel. Preferably, a portion of each bottom flange has two layers of steel, and the cold rolled steel beam includes a pair of end connectors extending generally orthogonally from the web and positioned generally orthogonally to the bottom flanges and the top flanges. Preferably, the cold rolled steel beam is cold formed from a unitary piece of sheet steel.

20 Claims, 11 Drawing Sheets

(51) Int. Cl.
*B62D 21/20* (2006.01)
*E04C 3/07* (2006.01)
*E04C 3/04* (2006.01)

(52) U.S. Cl.
CPC ............... *E04C 2003/0421* (2013.01); *E04C 2003/0434* (2013.01); *E04C 2003/0452* (2013.01); *Y10T 29/49634* (2015.01); *Y10T 428/12347* (2015.01); *Y10T 428/12354* (2015.01)

(58) Field of Classification Search
CPC ............... E04C 3/08; Y10T 428/12347; Y10T 428/12354; B62D 21/02; B62D 21/20
USPC .......................................................... 52/842
See application file for complete search history.

(56) References Cited

U.S. PATENT DOCUMENTS

| | | | | |
|---|---|---|---|---|
| 827,268 | A | 7/1906 | Stieper | |
| 991,603 | A * | 5/1911 | Brooks | 52/364 |
| 1,204,955 | A * | 11/1916 | Day | E04C 3/07 52/364 |
| 1,360,720 | A | 11/1920 | Brown et al. | |
| 1,457,303 | A * | 6/1923 | Higgins | 52/842 |
| 1,622,559 | A | 3/1927 | Zabriskie | |
| 1,915,424 | A | 6/1933 | Kerr | |
| 1,918,345 | A | 7/1933 | McHose | |
| 1,974,730 | A | 9/1934 | Zollinger | |
| 1,983,632 | A | 12/1934 | Miller | |
| 2,065,378 | A * | 12/1936 | Kling | 52/842 |
| 2,088,781 | A | 8/1937 | Folsom | |
| 2,108,373 | A | 2/1938 | Greulich | |
| 2,154,944 | A * | 4/1939 | Kullmer | 52/376 |
| 2,169,253 | A | 8/1939 | Kotrbaty | |
| 2,172,806 | A * | 9/1939 | Probeck | 29/897.35 |
| 2,194,810 | A | 3/1940 | Reiner | |
| 2,246,215 | A | 6/1941 | Nagin et al. | |
| 2,256,812 | A | 9/1941 | Miller | |
| RE21,921 | E * | 10/1941 | Greulich | 52/838 |
| 2,457,250 | A | 12/1948 | Macomber | |
| 2,514,607 | A | 7/1950 | McLean | |
| 2,624,430 | A | 1/1953 | Macomber | |
| 2,630,890 | A | 3/1953 | Macomber | |
| 2,630,899 | A | 3/1953 | Macomber | |
| 2,662,272 | A | 12/1953 | Macomber | |
| 2,670,061 | A * | 2/1954 | McMahon et al. | 52/377 |
| 2,737,270 | A * | 3/1956 | Hall | 52/377 |
| 2,747,704 | A * | 5/1956 | Gorey | 52/377 |
| 2,860,743 | A | 11/1958 | Cliff | |
| 2,864,471 | A | 12/1958 | Williams | |
| 3,158,731 | A | 11/1964 | Cape | |
| 3,221,467 | A | 12/1965 | Henkels | |
| 3,241,285 | A * | 3/1966 | Alvise | 52/842 |
| 3,256,670 | A * | 6/1966 | Tersigni | 52/634 |
| 3,288,977 | A | 11/1966 | Keller | |
| 3,349,535 | A | 10/1967 | Balinski | |
| 3,367,080 | A | 2/1968 | McClelland | |
| 3,381,439 | A | 5/1968 | Thulin, Jr. | |
| 3,483,665 | A | 12/1969 | Miller | |
| 3,487,861 | A | 1/1970 | Fahrenbach | |
| 3,626,567 | A | 12/1971 | Michelson et al. | |
| 3,639,962 | A | 2/1972 | Gooder | |
| 3,641,303 | A | 2/1972 | Collins | |
| 3,698,224 | A * | 10/1972 | Saytes | 72/178 |
| 3,818,083 | A | 6/1974 | Butts et al. | |
| 3,942,297 | A | 3/1976 | Kitagawa | |
| 3,945,168 | A | 3/1976 | Butts et al. | |
| 3,945,741 | A | 3/1976 | Wendt | |
| 3,979,868 | A | 9/1976 | Butts et al. | |
| 4,041,664 | A | 8/1977 | Davis, Jr. | |
| 4,056,908 | A | 11/1977 | McManus | |
| 4,109,440 | A * | 8/1978 | Bill | 52/839 |
| 4,122,647 | A | 10/1978 | Kovar | |
| 4,151,694 | A | 5/1979 | Sriberg et al. | |
| 4,159,604 | A | 7/1979 | Burrell | |
| 4,189,883 | A | 2/1980 | McManus | |
| 4,207,719 | A | 6/1980 | Knowles | |
| 4,281,497 | A | 8/1981 | Luotonen et al. | |
| 4,353,192 | A * | 10/1982 | Pearson et al. | 52/281 |
| 4,385,476 | A | 5/1983 | Slager | |
| 4,409,771 | A | 10/1983 | Lowe | |
| 4,421,969 | A | 12/1983 | Tanenbaum | |
| 4,432,178 | A | 2/1984 | Taft | |
| 4,441,292 | A | 4/1984 | Ericsson | |
| 4,454,695 | A | 6/1984 | Person | |
| 4,455,806 | A * | 6/1984 | Rice | 52/404.1 |
| 4,476,662 | A | 10/1984 | Fisher | |
| 4,490,958 | A | 1/1985 | Lowe | |
| 4,548,014 | A | 10/1985 | Knowles | |
| 4,549,381 | A | 10/1985 | Holtz | |
| 4,560,301 | A * | 12/1985 | Gilb | 403/232.1 |
| 4,566,240 | A | 1/1986 | Schilger | |
| 4,569,177 | A | 2/1986 | Ottinger | |
| 4,592,184 | A | 6/1986 | Person et al. | |
| 4,688,358 | A | 8/1987 | Madray | |
| 4,691,494 | A | 9/1987 | Gwynne | |
| 4,702,059 | A | 10/1987 | Holtz | |
| 4,715,155 | A | 12/1987 | Holtz | |
| 4,720,957 | A | 1/1988 | Madray | |
| 4,729,201 | A | 3/1988 | Laurus et al. | |
| 4,741,138 | A | 5/1988 | Rongoe, Jr. | |
| 4,793,113 | A * | 12/1988 | Bodnar | 52/481.1 |
| 4,836,436 | A | 6/1989 | Hannah | |
| 4,837,994 | A | 6/1989 | Stohs | |
| 4,845,908 | A | 7/1989 | Stohs | |
| 4,887,406 | A | 12/1989 | Saia | |
| 4,937,997 | A | 7/1990 | Thomas, Jr. et al. | |
| 4,937,998 | A | 7/1990 | Goldberg | |
| 4,947,612 | A | 8/1990 | Taylor et al. | |
| 4,982,545 | A | 1/1991 | Stromback | |
| 4,986,051 | A | 1/1991 | Meyer et al. | |
| 5,004,369 | A | 4/1991 | Young | |
| 5,146,726 | A | 9/1992 | Ellison, Jr. | |
| 5,207,045 | A | 5/1993 | Bodnar | |
| 5,214,900 | A | 6/1993 | Folkerts | |
| 5,220,761 | A | 6/1993 | Selby | |
| 5,230,190 | A | 7/1993 | Schuette | |
| 5,240,342 | A | 8/1993 | Kress, Jr. | |
| 5,301,486 | A | 4/1994 | Taylor | |
| 5,373,675 | A | 12/1994 | Ellison, Jr. | |
| 5,376,704 | A | 12/1994 | Barsotti | |
| 5,417,028 | A | 5/1995 | Meyer | |
| 5,476,704 | A | 12/1995 | Kohler | |
| 5,499,480 | A | 3/1996 | Bass | |
| 5,527,625 | A | 6/1996 | Bodnar | |
| 5,544,464 | A | 8/1996 | Dutil | |
| 5,546,716 | A | 8/1996 | Broxterman et al. | |
| 5,553,437 | A * | 9/1996 | Navon | 52/837 |
| 5,625,995 | A | 5/1997 | Martin | |
| 5,669,197 | A | 9/1997 | Bodnar | |
| 5,687,538 | A | 11/1997 | Frobosilo et al. | |
| 5,689,922 | A * | 11/1997 | Daudet | 52/210 |
| 5,761,873 | A | 6/1998 | Slater | |
| 5,771,653 | A | 6/1998 | Dolati et al. | |
| 5,842,318 | A | 12/1998 | Bass et al. | |
| 5,865,008 | A | 2/1999 | Larson | |
| 5,875,605 | A | 3/1999 | Rudd | |
| 5,895,534 | A | 4/1999 | Daley et al. | |
| 5,896,724 | A * | 4/1999 | Tofts | 52/842 |
| 5,927,036 | A | 7/1999 | Matthews et al. | |
| 5,937,608 | A | 8/1999 | Kucirka | |
| 5,941,035 | A | 8/1999 | Purse | |
| 6,073,414 | A | 6/2000 | Garris et al. | |
| 6,131,362 | A | 10/2000 | Buecker | |
| 6,170,217 | B1 | 1/2001 | Meyer | |
| 6,254,306 | B1 | 7/2001 | Williams | |
| 6,263,634 | B1 | 7/2001 | Bodnar et al. | |
| 6,301,854 | B1 | 10/2001 | Daudet et al. | |
| 6,301,857 | B1 | 10/2001 | Vrana | |
| 6,415,577 | B1 | 7/2002 | Curtis | |
| 6,418,694 | B1 | 7/2002 | Daudet et al. | |
| 6,436,552 | B1 | 8/2002 | Walker et al. | |

(56) References Cited

U.S. PATENT DOCUMENTS

| | | |
|---|---|---|
| 6,457,292 B1 | 10/2002 | Vrana |
| 6,484,464 B1 | 11/2002 | Ochoa |
| 6,519,908 B1 | 2/2003 | Masterson et al. |
| 6,571,527 B1 | 6/2003 | Rattini |
| 6,634,153 B1 | 10/2003 | Peterson |
| 6,658,809 B2 | 12/2003 | Collins |
| 6,662,517 B1 | 12/2003 | Thompson |
| 6,761,005 B1 | 7/2004 | Daudet et al. |
| 6,799,406 B2 | 10/2004 | Gosselin et al. |
| 6,799,407 B2 | 10/2004 | Saldana |
| 6,843,036 B2 | 1/2005 | Stewart, III |
| 6,874,294 B2 | 4/2005 | Masterson et al. |
| 6,964,140 B2 | 11/2005 | Walker et al. |
| 7,086,208 B2 | 8/2006 | Masterson et al. |
| 7,093,401 B2 | 8/2006 | Collins |
| 7,107,730 B2 | 9/2006 | Park |
| 7,231,746 B2 | 6/2007 | Bodnar |
| 7,240,463 B2 | 7/2007 | Masterson et al. |
| 7,409,804 B2 | 8/2008 | Moody et al. |
| 7,546,714 B2 | 6/2009 | Masterson et al. |
| 8,359,812 B2 * | 1/2013 | Raheel et al. .................. 52/842 |
| 8,590,275 B2 * | 11/2013 | Platt ................................. 52/842 |
| 2001/0004825 A1 * | 6/2001 | Menendez .................... 52/736.1 |
| 2002/0020138 A1 | 2/2002 | Walker et al. |
| 2002/0029538 A1 | 3/2002 | Webb |
| 2002/0046534 A1 | 4/2002 | Heinly |
| 2002/0069606 A1 | 6/2002 | Gosselin et al. |
| 2002/0144484 A1 | 10/2002 | Vrana |
| 2003/0014934 A1 | 1/2003 | Bodnar |
| 2003/0014935 A1 | 1/2003 | Bodnar |
| 2003/0061780 A1 | 4/2003 | Masterson |
| 2003/0084637 A1 | 5/2003 | Daudet |
| 2004/0244330 A1 * | 12/2004 | Takeuchi et al. ............ 52/729.1 |
| 2005/0102962 A1 | 5/2005 | McInerney et al. |
| 2005/0144892 A1 | 7/2005 | Strickland et al. |
| 2008/0196332 A1 * | 8/2008 | Surowiecki .................. 52/204.2 |

FOREIGN PATENT DOCUMENTS

| | | | | |
|---|---|---|---|---|
| AU | 543398 | | 1/1985 | |
| AU | 14733/97 | | 2/1997 | |
| AU | 199952660 | | 10/1999 | |
| AU | 762835 | | 7/2003 | |
| AU | 2004100666 | | 8/2004 | |
| CA | 900687 | | 5/1972 | |
| CA | 1172463 | | 8/1984 | |
| CA | 2092809 | | 11/2001 | |
| CA | 2412726 | | 11/2009 | |
| CA | 2455071 | | 11/2011 | |
| FR | 2269618 | * | 11/1975 | ............... E04B 5/40 |
| GB | 668485 | | 3/1952 | |
| GB | 1447055 | | 8/1976 | |
| GB | 2102465 | * | 2/1983 | ............... E04C 3/07 |
| GB | 2340141 | | 2/2000 | |
| JP | 8338103 | | 12/1996 | |
| WO | 02/01016 | | 1/2002 | |
| WO | 03/057931 | | 7/2003 | |
| WO | 2005/042869 | | 5/2005 | |

OTHER PUBLICATIONS

Ortech Industries PTY Ltd., Easibeams Steel Sections [pamphlet] (no date).

International Search Report for PCT/CA2010/001405, dated Jan. 27, 2011.

* cited by examiner

ROLL FORMED STEEL BEAM

CROSS REFERENCE TO RELATED APPLICATIONS

This patent application is a National Phase application claiming the benefit of PCT/CA2010/001128 filed on Jul. 22, 2010 in English, entitled ROLL FORMED STEEL BEAM; which further claims the priority benefit from, U.S. Provisional Patent Application Ser. No. 61/227,614 filed on Jul. 22, 2009, both of which are incorporated herein by reference in their entirety.

FIELD OF THE INVENTION

This invention relates to beams and in particular cold rolled I-beams made from a unitary piece of coil material. The beams are particularly useful for light structural member applications wherein I, W and S shape members are traditionally used. This new art is especially applicable to, but not limited to trailer beams, formwork beams and structural framing members.

BACKGROUND OF THE INVENTION

In the past trailers for commercial use that are hauled by heavy trucks have been built with numerous small I-Shape beams. These beams are hot rolled to very tight section and thickness tolerances. These beams comprise a significant part of the weight of a trailer bed. Typically these trailer beams have a plate welded at the end. After fabrication a finish is applied to the beams since they may be exposed to difficult weathering conditions. The hot rolled beams used today are typically expensive to manufacture because there is not a lot of weight in the each section. Steel mills generally prefer to roll larger sections because they can do so more cost effectively and as such increases output.

Previously, concrete formwork systems have benefited from the beam described in U.S. Pat. No. 3,787,020, issued Jan. 22, 1974 to Avery. The beam described therein is a generally I shaped member that is formed out of aluminum and is sold under the AlumaBeam™ trademark of Aluma Building Systems, Inc. Further concrete formwork structures are described in U.S. Pat. No. 4,156,999 issued June, 1979 to Avery and U.S. Pat. No. 3,899,152, issued Aug. 12, 1975 to Avery. These beams have specific geometry for accommodating various installation attributes; the finite shaped member is accurately formed using aluminum extrusion, providing a very precise shape that is light weight. However, aluminum is very expensive, thus these beams are expensive to produce.

In the past the structural steel I, S and W shapes have been used extensively for fabrication of buildings and various types of framing systems. The shape in itself is very efficient structurally, but when customizing small members with connections and providing protective coating the costs per unit weight become very expensive.

It would be desirable to provide alternate structural steel members that may be used in commercial trailers, concrete formwork systems and various framing systems.

Given the need to conserve energy today it would be advantageous to find a means to reduce the weight of the beams It would be desirable to have light weight structural members that require less handling for installing connections and for finishing.

SUMMARY OF THE INVENTION

In a preferred embodiment of the present invention, there is provided a cold rolled steel beam comprising: a web having two layers of steel, the web having a top end and a bottom end; a pair of bottom flanges extending outwardly from the bottom end of the web; and a pair of top flanges extending outwardly from the top end of the web, each top flange having two layers of steel. Preferably, a portion of each bottom flange has two layers of steel, and the cold rolled steel beam includes a pair of end connectors extending generally orthogonally from the web and positioned generally orthogonally to the bottom flanges and the top flanges. Preferably, the cold rolled steel beam is cold formed from a unitary piece of sheet steel.

Preferably, spaced apart physical connections are provided along a length of the cold rolled steel beam. The spaced apart physical connections are preferably chosen from the group consisting of weld, rivet, clinch material fold, screw, bolt and a combination thereof. The spaced apart physical connections preferably fasten the two layers of steel in the web together.

Preferably, the cold rolled steel beam has a prefinished surface treatment that is one of galvanized, galvanealed, and painted coating.

In a further embodiment of the present invention, the cold rolled steel beam further includes an entry wedge whereby the entry wedge is adapted to allow a punch to gain entry. Preferably, the cold rolled steel beam includes a stiffener in the web and each end connector, said stiffener being a deformation in the cold rolled steel beam.

In a further embodiment of the present invention, the cold rolled steel beam further includes a pair of end connectors fastened to the web with a fastener placed in a hole in the web, said fastener being one of: weld, rivet, clinch material fold, screw, and bolt; said pair of end connectors extending generally orthogonally from the web and positioned generally orthogonally to the bottom flanges and the top flanges.

In a further embodiment of the present invention, the cold rolled steel beam further includes a nailing material strip, each top flange has at least one bend such that a surface of each top flange contacts a surface of the nailing material strip. Preferably, each top flange has at least two bends, each bend being generally perpendicular in angle, and wherein the nailing material strip is made from a material selected from the group consisting of: wood, plastic, and composite. Even more preferably, each bottom flange has at least two bends forming a cavity between the bends for receiving a fastener in the cavity, the bends extending down a length of the cold rolled steel beam. The fastener is preferably a bolt head, and the cold rolled steel beam is fastenable to a surrounding structure with said fastener.

In a further embodiment of the present invention, the cold rolled steel beam is adapted for use as a trailer beam.

In a preferred embodiment of the present invention, there is provided a method for producing cold rolled steel beams from a coil of steel material, comprising the steps of: passing the steel material through a roll forming mill and cutting the steel to a predetermined length to produce cut steel material; passing the cut steel material through rollers to form a cold rolled steel beam having a web, at least one top flange, and at least one bottom flange, the web having two layers of steel. Preferably, the method further includes the step of fastening said two layers of steel in the web with a fastener. The fastener is preferably one of weld, rivet, clinch material fold, screw, and bolt.

In a further embodiment of the present invention, the method further includes the step: punching end connector bolting holes for fastening end connectors that are positioned generally orthogonally to the web and top and bottom flanges at each end of the cold rolled steel beam.

In a further embodiment of the present invention, said cut steel material has an end connector at each end thereof, and the method further includes the step of: punching each end connector by folding each end connector so that each end connector is positioned generally orthogonally to the web and top and bottom flanges at each end of the cold rolled steel beam.

Preferably, the method includes the step of punching stiffeners between each end connector and the web. Even more preferably, the cold rolled steel beam includes a pair of bottom flanges extending outwardly from the bottom end of the web; and a pair of top flanges extending outwardly from the top end of the web; each top flange having two layers of steel; and each top flange having two layers of steel.

A further understanding of the functional and advantageous aspects of the invention can be realized by reference to the following detailed description and drawings.

BRIEF DESCRIPTION OF THE DRAWINGS

The invention will now be described by way of example only, with reference to the accompanying drawings, in which.

DETAILED DESCRIPTION OF THE INVENTION

Figure 1:
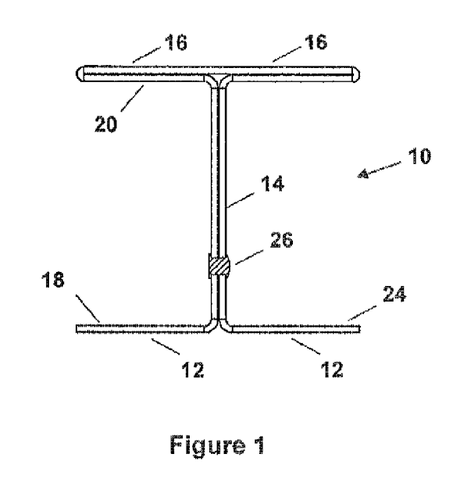
FIG. 1 is a cross sectional view of a roll formed beam constructed in accordance with the present invention.

Referring to FIG. 1, a steel I-Beam is made by cold forming beams from coil material and is shown generally at 10. Beam 10 is a cold rolled steel beam including a bottom pair of bottom flanges 12, a web 14 and a pair of top flanges 16. The web 14 has a double thickness of steel and the top flanges 16 have a double thickness of steel. The beam 10 is constructed from a unitary piece of coil material. The cross section of the steel starts 18 at one side of the bottom flange 12 makes a generally 90 degree turn to form ones side of the web 14. It makes another generally 90 degree turn to form one side of a bottom portion 20 of the top flange 16. It makes a generally 180 degree fold to form the top portion 22 of the top flange 16 and then makes another generally 180 degree fold to form the other side of the bottom portion of the top flange 16. It then makes a generally 90 degree turn to form the other side of the web 14 and then a generally 90 degree turn to form the other side of the bottom flange 12 to end at 24. Spaced apart physical connections 26 or joins are provided at predetermined centres along the length of the beam. Those skilled in the art will appreciate that the physical connections 26 increase the strength of the beam and may be placed according to the dimensions of the beam. The joins or connections 26 may be by way of weld, rivet, clinch material fold, screw, bolt or other method or a combination thereof. The joins or connections 26 fasten the two layers of steel in the web 14 together.

Figure 2:
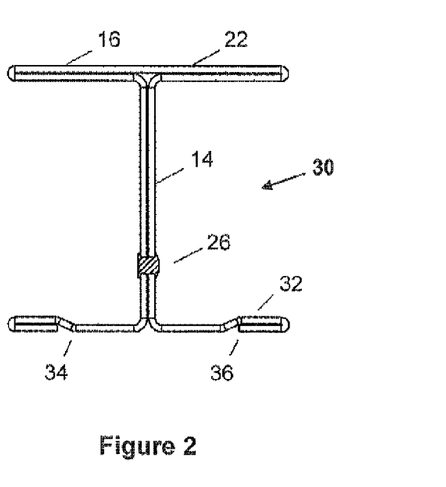
FIG. 2 is a cross sectional view of an alternate embodiment of a roll formed beam constructed in accordance with the present invention.

An alternate embodiment of the steel I-Beam is shown generally at 30 (FIG. 2). Roll formed steel beam 30 is similar to beam 10 except for the bottom flange which has return lower flanges. Beam 30 has a double layered bottom flange 32. As above the web 14 has a double thickness and the top flange 16 has a double thickness. The roll formed beam 30 is constructed from a unitary piece of steel coil material. The cross section of the steel starts at 34 extends outwardly then has a generally 180 degree bend and back inwardly. The steel then takes a slight bend so that the remainder of the bottom flange is generally in the same plane as the initial section. Thereafter the shape is the same as with beam 10 until the other side of the bottom flange wherein it is the mirror image of the beginning and the steel ends at 36.

Figure 3:
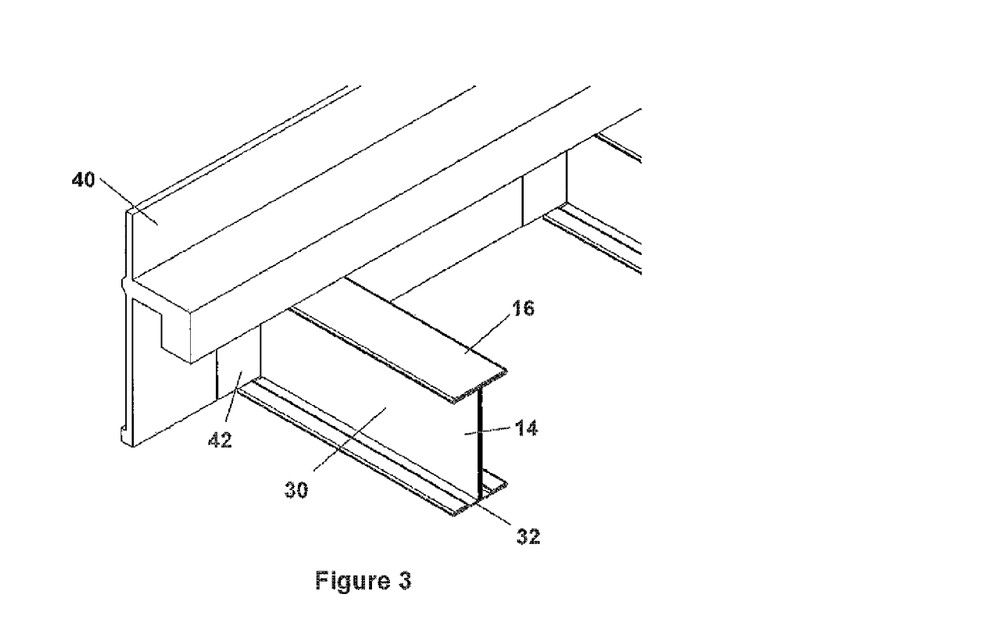
FIG. 3 is an enlarged perspective view of the connection portion of the roll formed beam of FIG. 2.
Figure 4:
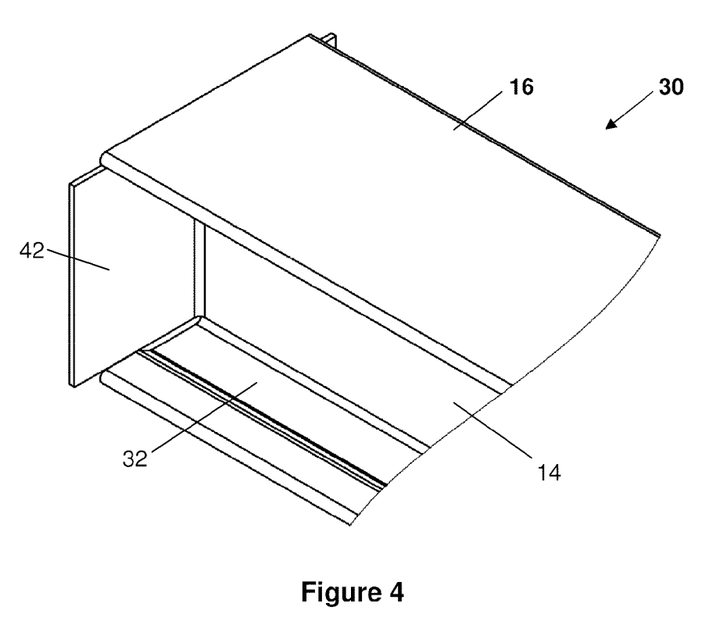
FIG. 4 is a perspective view of the end connector of a roll formed beam.

FIG. 3 shows roll formed steel beam 30 connected to another beam 40. Beam 30 includes an end connector 42. End connectors 42 extend generally orthogonally to the web 14 at each end of the beam. The end connectors 42 are generally orthogonal to the top and bottom flanges. As shown in FIG. 4 end connectors may also be part of beam 10 or beam 30.

Figure 5:
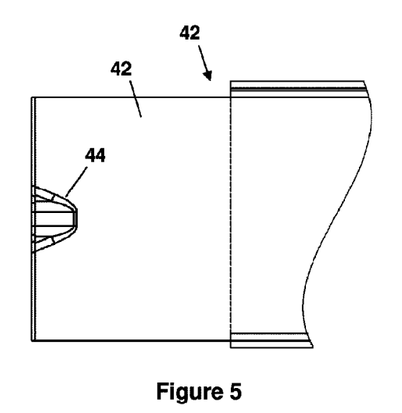
FIG. 5 is a side view of a partially formed roll formed beam prior to forming the end connector portions.
Figure 6:
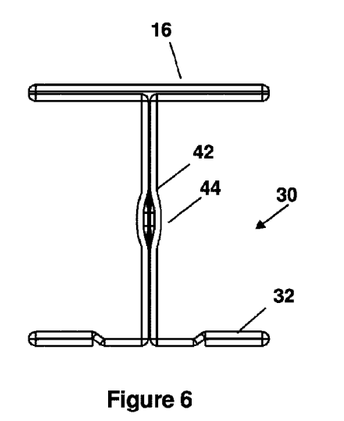
FIG. 6 is an end view of the partially formed roll formed beam of FIG. 2.
Figure 9:
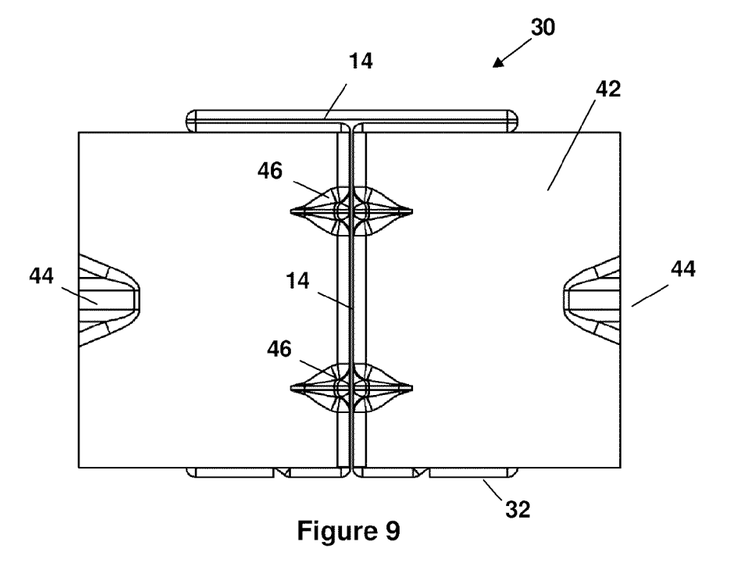
FIG. 9 is an end view similar to that shown in FIG. 6 but showing the end connector portions after final forming.

The end connectors 42 may be formed from pre-punched ends of steel coil material. Preferably, material is provided at the cutoff stage of production that can be used for the end connector 42. The cutoff stage is before cut steel coil material is formed into the shape shown in FIGS. 1 and 2. Preferably each end connector 42 has an entry wedge 44 that provides a location for a punch to gain entry between the plates after the roll forming has been completed, as shown in FIGS. 5 and 6. The entry wedge 44 is provided when the material is cut off, which takes place prior to entering the roll former. The entry wedge 44 is coordinated with the roll form tooling design so that entry wedge 44 will not be damaged throughout the roll forming process. The coil materials with pre-punched ends are passed through roll-former. Rollers in roll former are designed to provide an unobstructed path for entry wedge 44 to feed through without being damaged. FIG. 9 shows beam 30 after end connectors 42 has been punched so that end connectors 42 are generally orthogonal to web 14.

Figure 7:
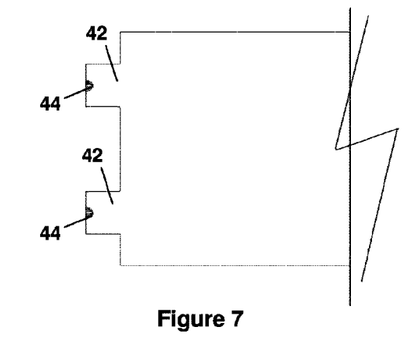
FIG. 7 is an enlarged side view of the coil material showing the pre-punched end connector portions and the entry wedges.
Figure 8:
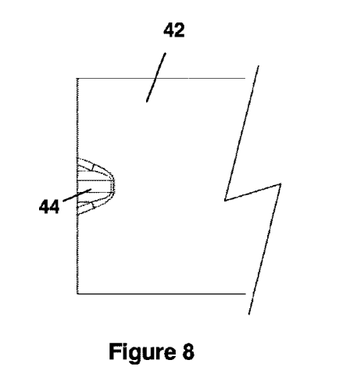
FIG. 8 is a side view of the end connector portion of the roll formed beam showing the entry wedge.
Figure 10:
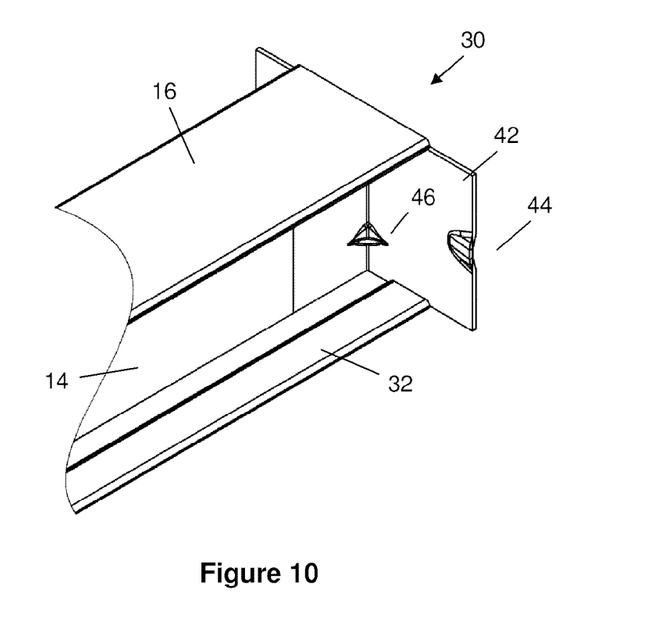
FIG. 10 is a perspective view of FIG. 9

FIG. 7 shows the pre-punched end of the coil material with two end connectors 42 before the end connector or roll formed beam has been formed. FIG. 8 shows an enlarged view of the end connector 42 before the end connector or roll formed beam has been formed. FIGS. 7 and 8 show end connectors 42 having entry wedge 44 after the beam has been formed but before the end connector 42 has been folded to be orthogonal to the web 14. Beams 10 and 30 may also include stiffeners 46 as shown in FIGS. 9 and 10 which may be punched in after the end connector forming has taken place. Stiffeners 46 are deformations in the steel material for providing rigidity to the end connectors 42.

Figure 11:
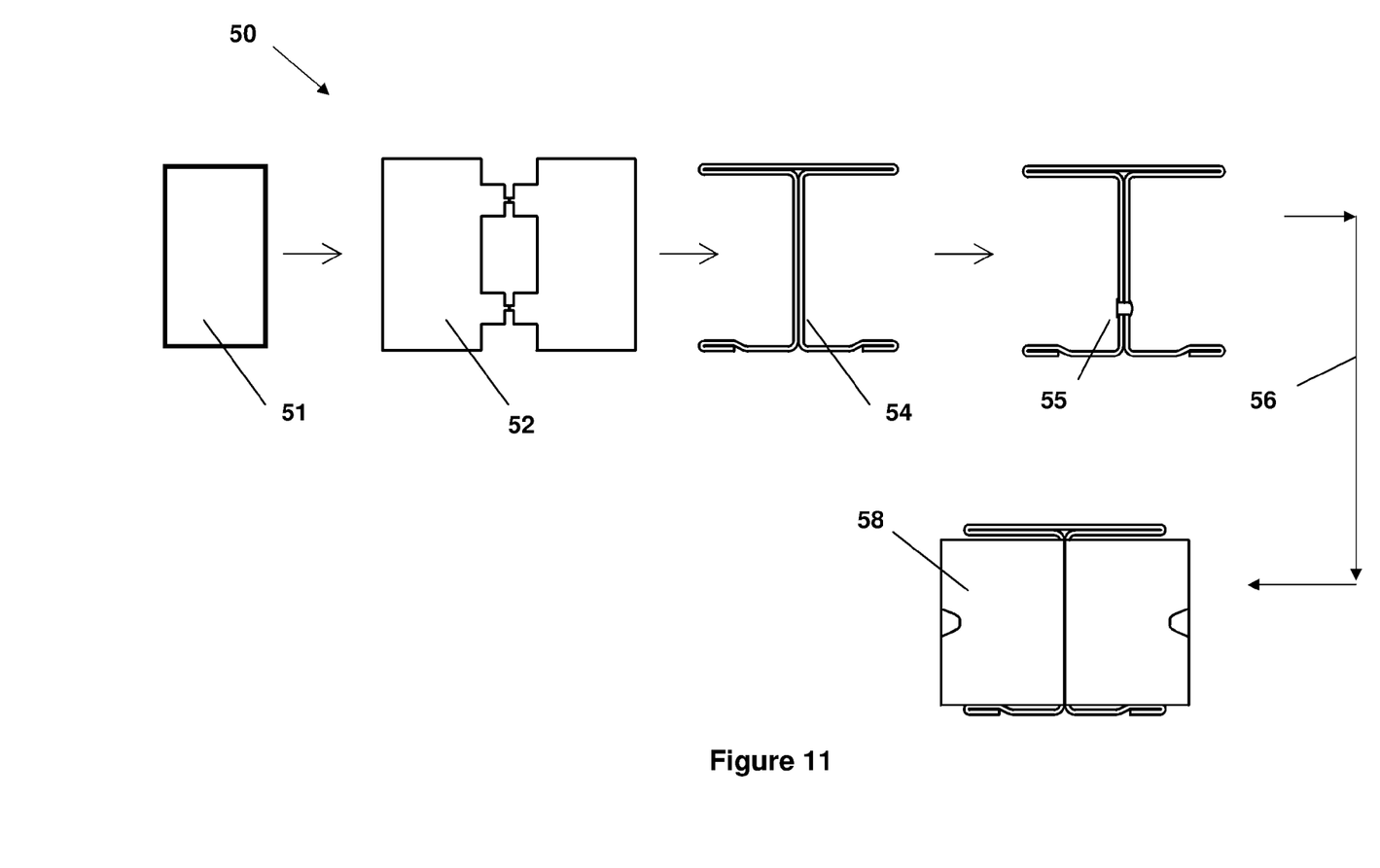
FIG. 11 is a flow chart showing a beam at each step in the manufacturing process of the roll formed trailer beam of the present invention.

The present invention further includes a method to form the connections into each beam as a function of the roll forming process as shown in FIG. 11 generally at 50. In step 51, steel material is uncoiled in preparation for step 52. In step 52, the steel material from a coil is passed through a punch, the material is cut to a predetermined length, and preferably an entry wedge is provided. In step 54, the cut steel material is then passed through a roll forming mill and is shaped into an I-beam. In step 55, spaced apart connections or joins are provided. In step 56, the I-beam is moved off line and in step 58, the end connectors are punched into the beam. Optionally the stiffeners may be punched into the beams after step 58. Preferably the beam will be made from material that has a substantial surface treatment such as a galvanized G90 coating. Preferably the steel has a prefinished surface treatment that is one of galvanized, galvanealed, and painted coating. The connector combined with the finish would allow no handling or labor to weld on connectors and apply the protective coating. This method uses less material than prior art methods of forming hot rolled sections for the same beam shape.

Figure 12:
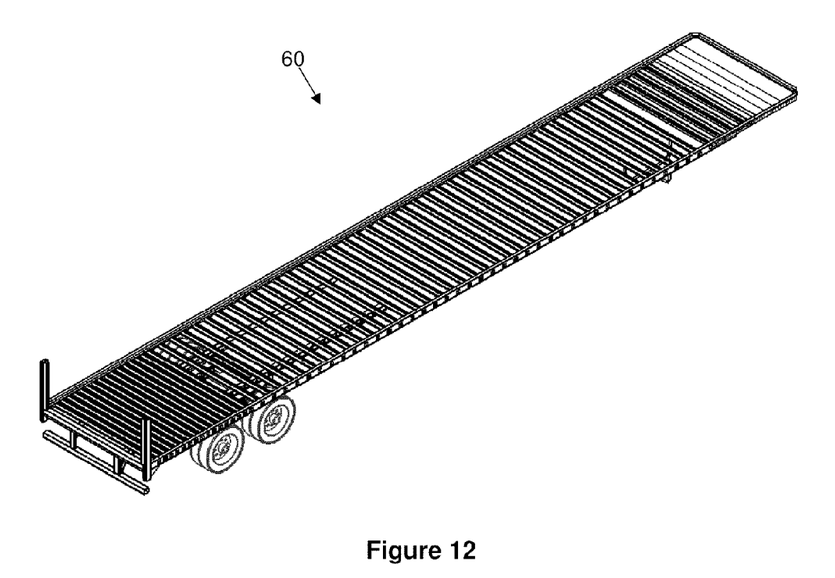
FIG. 12 is a perspective view of a trailer bed.
Figure 13:
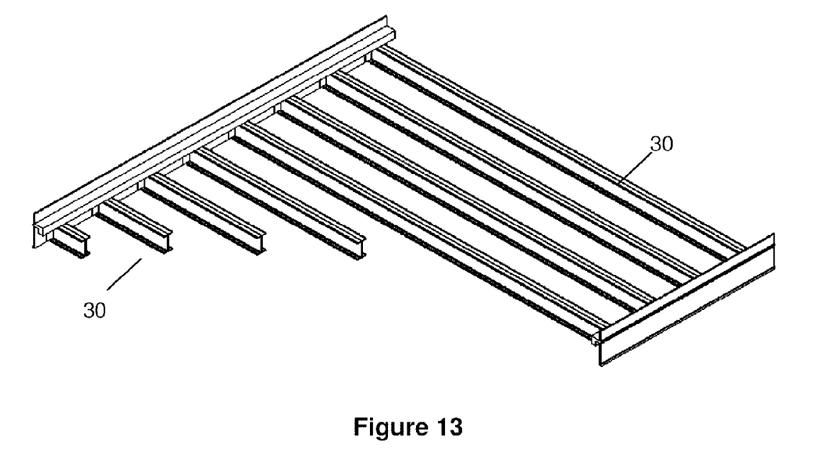
FIG. 13 is a perspective view of a portion of the trailer bed similar to that shown in FIG. 12 constructed using the roll formed beams of the present invention.

Beams 10 and 30 are particularly suited as beams in a trailer 60 as shown in FIG. 12. FIG. 13 is a perspective view of a portion of the trailer bed similar shown in FIG. 12 constructed using the roll formed beams 30 of the present invention. Prior art trailer beams are traditionally made using a hot rolled steel process. In particular prior art methods of hot rolling beams use more material than that used in the process herein. Further, prior art methods of hot rolling beams use have considerable labour cost in attaching end connectors.

Figures 14, 15:
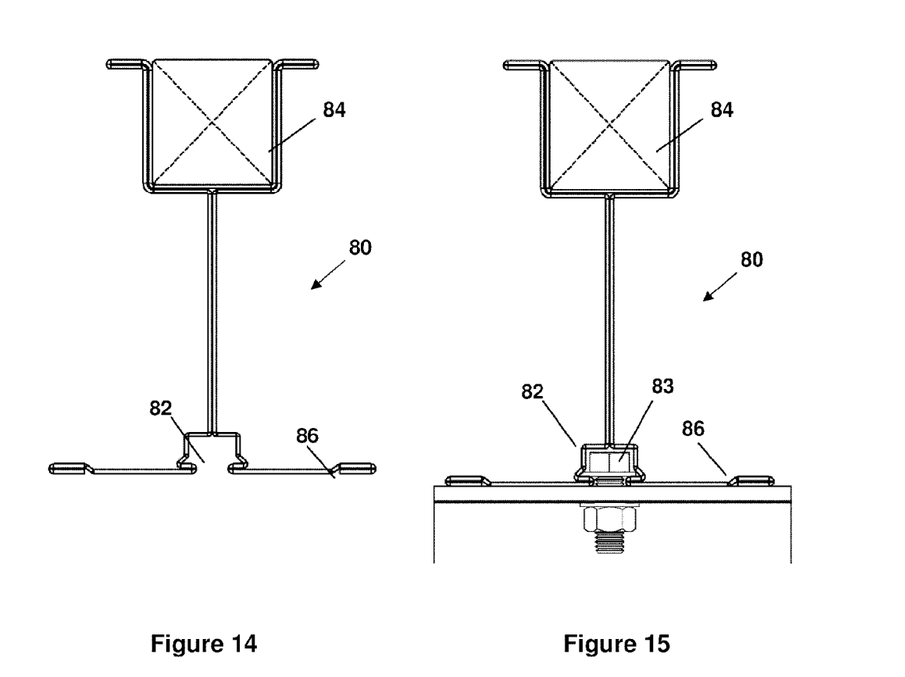
FIG. 14 is a cross-section view of the roll formed beam with a nailer chord and a cavity for fastening the beam to a surrounding structure with a bolt.
FIG. 15 is a cross-section view of the roll formed beam with a nailer chord fastened to a surrounding structure with a bolt.
Figure 16:
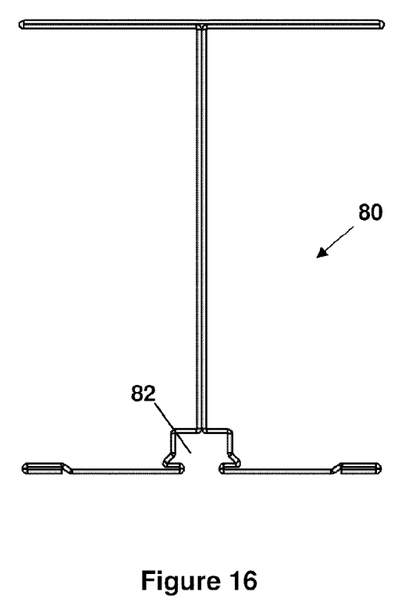
FIG. 16 is a cross-sectional view of the roll formed beam with a cavity for fastening the beam to a surrounding structure with a bolt.
Figure 17:
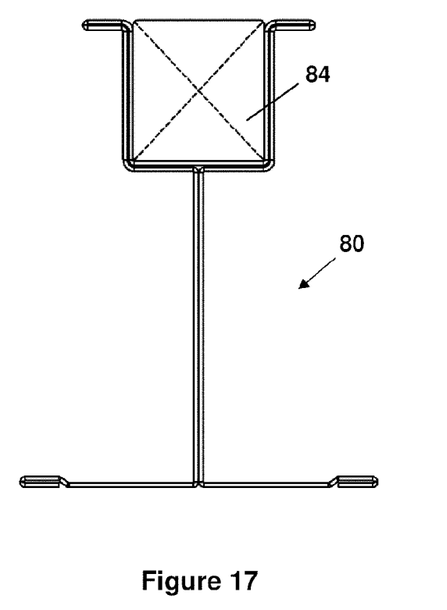
FIG. 17 is a cross-sectional view of the roll formed beam with a nailer chord.

In a further aspect of the present invention, the roll formed beam may include additional bends in the top flange and the bottom flange to accommodate a framework. As shown in FIG. 14, a beam adapted for use with a nailing material strip or nailer strip is shown generally at 80. Beam 80 includes additional bends and include nailer strip 84 which extends the entire length of the beam. Preferably, nailer strip 84 is made of wood, though other materials may be used such as plastic or composite materials. Beam 80 further includes a series of folds forming a cavity 82 that may engage with a bolt head 83 or other protrusion, as shown in FIG. 15. Cavity 82 allows the beam 80 to be fastened to a surrounding structure such as a truss 90, shown in FIG. 18. Preferably, cavity 82 extends the length of the beam. FIGS. 16 and 17 show alternative embodiments of the present invention wherein only a cavity 82 (FIG. 16) or a nailer chord 84 (FIG. 17) are included in beam 80. Preferably, bolt heads 83 engage cavity 82 by sliding bolt heads 83 longitudinally from an end of beam 80. Alternatively, beam 80 may engage cavity 82 with bolt heads 83 by sliding the beam longitudinally such that bolt heads 83 slide into cavity 80 from the side.

Figure 18:
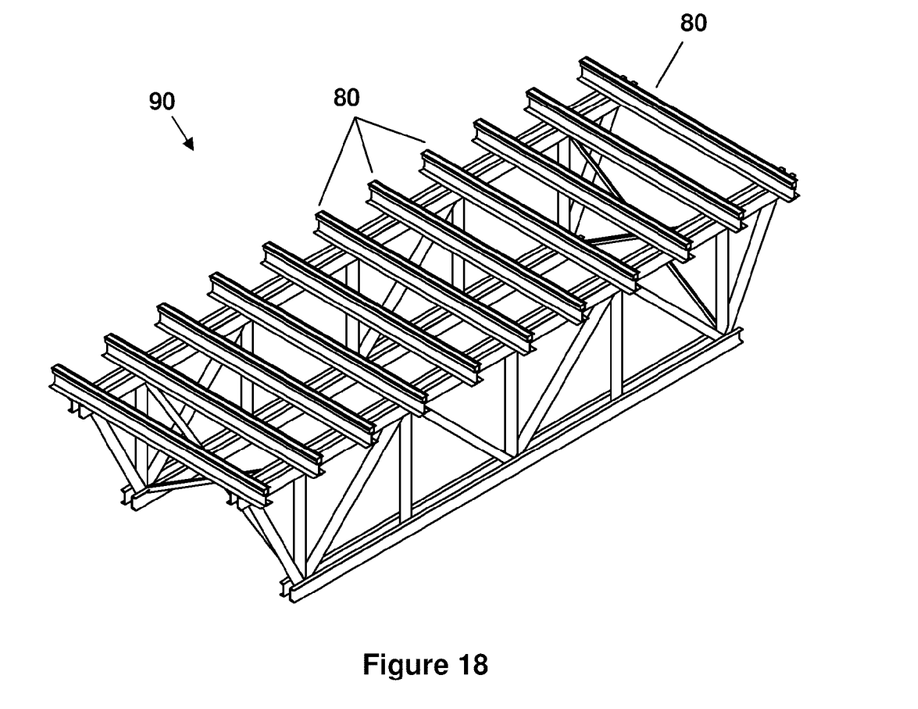
FIG. 18 is a perspective view of a truss with the roll-formed beam of FIG. 14.

The structure shown in FIG. 18 allows for an efficient method of concrete forming of high-rise buildings. Numerous beams 80 may be placed on a pair of trusses 90. Plywood sheathing may be nailed to the beams 80 through the nailer strip 84. This provides a light weight section of completed formwork that may be reused to pour concrete for more than one floor. The framework may be lowered slightly, then a crane can be hooked on and the complete formwork system slid outside of the building and jumped to the next level to pour the next floor.

Figure 19:
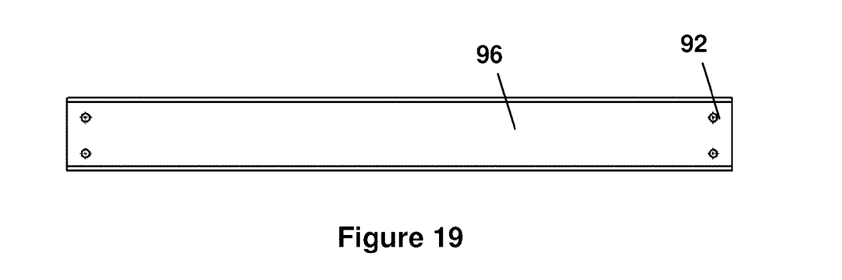
FIG. 19 is a roll-formed beam with connector holes.
Figure 20:
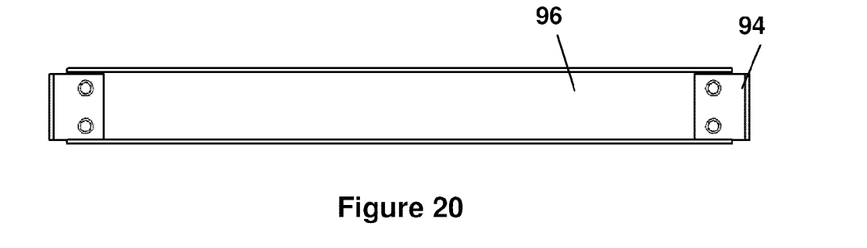
FIG. 20 is a roll-formed beam with connectors.
Figure 21:
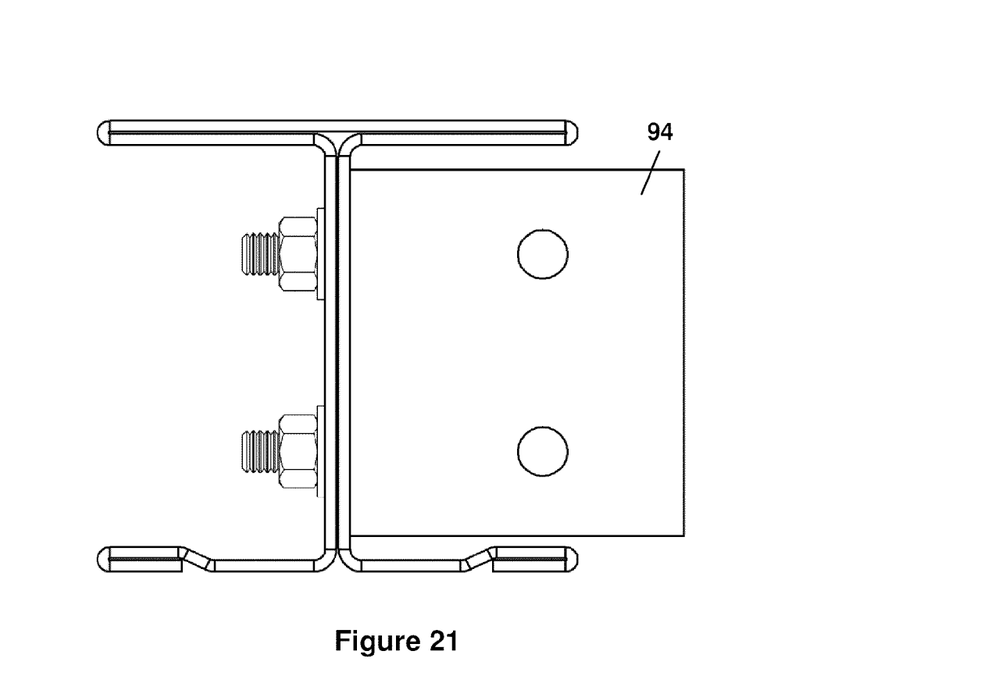
FIG. 21 is a side view of the connector of FIG. 18.
Figure 22:
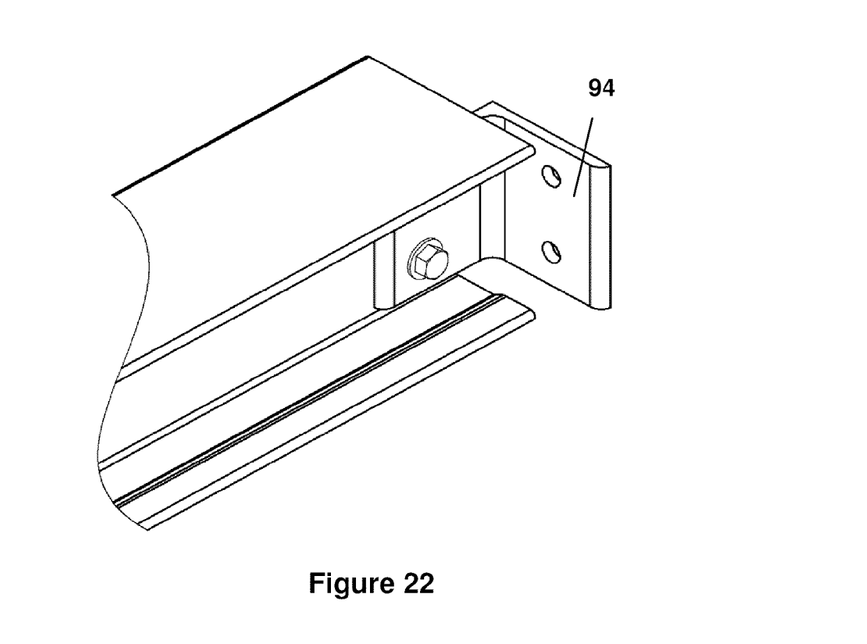
FIG. 22 is a perspective view of FIG. 19.

In a further aspect of the present invention, the beams may include connection holes 92 in the web for receiving fasteners to install angled connectors 94, as shown in FIG. 19 and FIG. 20. The fasteners are preferably one of weld, rivet, clinch material fold, screw, and bolt. Angled connectors 94 are substantially L-shaped connectors attached to the web of beam 96, and allow beam 96 to be fastened to surrounding structures. Beam 96 is roll formed and is preferably an I, W, or S shape in cross-section. Angled connectors 94 are best viewed in FIGS. 21 and 22.

In the structural steel fabrication industry, hot rolled small beams are more costly per unit weight to purchase compared with hot rolled heavy sections. Drilling, punching or cutting small holes as well and painting light weight hot rolled sections requires a high degree of man hours per unit weight in comparison with heavy hot rolled shapes. The use of beam 96 reduces the man hours required to roll form, provide connection details, and include a protective coating to about 1.5 man hours per ton. In comparison, the industry expectation for fabricating and painting small hot rolled members may be as high as 5 man hours per ton.

Figure 23:
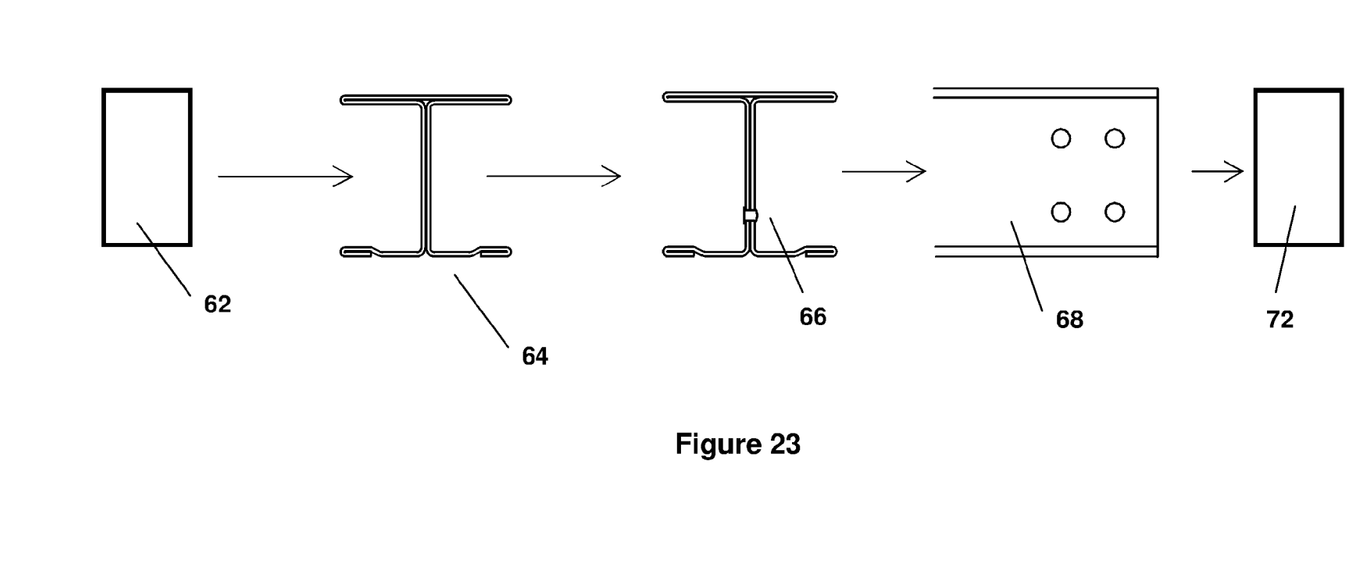
FIG. 23 is a flow chart illustrating a beam at each step of the manufacturing process for the beam of FIG. 19.

The present invention further includes a method to form beams 80, as shown in FIG. 23. In step 62, steel material is uncoiled in preparation of step 64. In step 64, the uncoiled steel material is passed through a roll-former where the steel material is shaped substantially into an I-shape. In step 66, spaced apart connections 26 or joins are provided, thereby fastening the web. In step 68, connector holes are punched 68. In step 72, the beams are cut off from the remaining sheet metal.

Generally speaking, the systems described herein are directed to a new I-beams and use therefore as a trailer beam. As required, embodiments of the present invention are disclosed herein. However, the disclosed embodiments are merely exemplary, and it should be understood that the invention may be embodied in many various and alternative forms. The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to I-beams and use therefore as a trailer beam.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

What is claimed as the invention is:

1. A cold rolled steel beam from a unitary piece of steel comprising:
    a web having two layers of steel and a plurality of physical connections spaced along a length of the web, holding the two layers of steel together, the two layers of the web extending continuously from a top end to a bottom end;
    a pair of bottom flanges extending away from each other in opposite directions at the bottom end of the web, each bottom flange having a single layer portion spanning between a proximal end extending from one of the two layers of the web and a distal end of the bottom flange; and
    a pair of top flanges extending outwardly and orthogonally from the top end of the web, each top flange having two layers of steel folded along its entirety as lower and upper layers substantially in contact with each other,
    wherein the cold rolled steel beam is formed from a unitary piece of galvanized steel, and
    wherein a portion of both of the distal end and the proximal end of each bottom flange is folded to form two layers of galvanized steel.

2. The cold rolled steel beam as claimed in claim 1 further including a pair of end connectors extending generally orthogonally from the web and positioned generally orthogonally to the bottom flanges and the top flanges.

3. The cold rolled steel beam as claimed in claim 2 wherein each end connector further includes an entry wedge whereby the entry wedge is adapted to allow a punch to gain entry.

4. The cold rolled steel beam as claimed in claim 2 further including a stiffener being a deformation in the cold rolled steel beam.

5. The cold rolled steel beam as claimed in claim 1,
    further including a pair of end connectors fastened to the web with a fastener placed in a hole in the web, said fastener being one of: weld, rivet, clinch material fold, screw, and bolt;
    said pair of end connectors extending generally orthogonally from the web and positioned generally orthogonally to the bottom flanges and the top flanges.

6. The cold rolled steel beam as claimed in claim 5 further including a nailing material strip, each top flange has at least one bend such that a surface of each top flange contacts a surface of the nailing material strip.

7. The cold rolled steel beam as claimed in claim 6 wherein each top flange has at least two bends, each bend being generally perpendicular in angle, and wherein the nailing material strip is made from a material selected from the group consisting of: wood, plastic, and composite.

8. The cold rolled steel beam as claimed in claim 7 wherein each bottom flange has at least two bends forming a cavity between the bends for receiving a fastener in the cavity, the bends extending down a length of the cold rolled steel beam.

9. The cold rolled steel beam as claimed in claim 8 wherein said fastener is a bolt head, and wherein the cold rolled steel beam is fastenable to a surrounding structure with said fastener.

10. The cold rolled steel beam as claimed in claim 1 wherein the spaced apart physical connections are chosen from the group consisting of weld, rivet, clinch material fold, screw, bolt and a combination thereof.

11. The cold rolled steel beam as claimed in claim 1 wherein the cold rolled steel beam is adapted for use as a trailer beam.

12. The cold rolled steel beam as claimed in claim 1 wherein said cold rolled steel beam has a prefinished surface treatment that is painted coating.

13. The cold rolled steel beam as claimed in claim 1 further including a nailing material strip, each top flange has at least one bend such that a surface of each top flange contacts a surface of the nailing material strip.

14. The cold rolled steel beam as claimed in claim 1 wherein each bottom flange has at least two bends forming a cavity between the bends for receiving a fastener in the cavity, the bends extending down a length of the cold rolled steel beam.

15. A method for producing cold rolled steel beams from a coil of steel material, comprising the steps of:
    passing the steel material through a roll forming mill and cutting the steel to a predetermined length to produce cut steel material;
    passing the cut steel material through rollers to form a cold rolled steel beam comprising a web having two layers of steel and a plurality of physical connections spaced along a length of the web, holding the two layers of steel together, the two layers of the web extending continuously from a top end to a bottom end, a pair of top flanges extending outwardly and orthogonally from the top end of the web, each top flange having two layers of steel folded along its entirety as lower and upper layers substantially in contact with each other, and a pair of bottom flanges extending away from each other in opposite directions at the bottom end of the web, each bottom flange having a single layer portion spanning between a proximal end extending from one of the two layers of the web and a distal end of the bottom flange,
    wherein the cold rolled steel beam is formed from a unitary piece of galvanized steel, and wherein a portion of both of the distal end and the proximal end of each bottom flange is folded to form two layers of galvanized steel.

16. The method as claimed in claim 15 further including the step of fastening said two layers of steel in the web with a fastener.

17. The method as claimed in claim 16 wherein the fastener is one of weld, rivet, clinch material fold, screw, and bolt.

18. The method as claimed in claim 15 further including the step:
    punching end connector bolting holes for fastening end connectors that are positioned generally orthogonally to the web and top and bottom flanges at each end of the cold rolled steel beam.

19. The method as claimed in claim 15 wherein said cut steel material has an end connector at each end thereof, and wherein the method further includes the step:
    punching each end connector by folding each end connector so that each end connector is positioned generally orthogonally to the web and top and bottom flanges at each end of the cold rolled steel beam.

20. The method as claimed in claim 19 further including the step of punching stiffeners between each end connector and the web.

\* \* \* \* \*